US006862005B2

United States Patent
Someya

(10) Patent No.: US 6,862,005 B2
(45) Date of Patent: Mar. 1, 2005

(54) APPARATUS, METHOD AND PROGRAM FOR CAUSING A PLURALITY OF DISPLAY UNITS TO DISPLAY IMAGES

(75) Inventor: Jun Someya, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 301 days.

(21) Appl. No.: 10/267,642

(22) Filed: Oct. 10, 2002

(65) Prior Publication Data

US 2003/0179155 A1 Sep. 25, 2003

(30) Foreign Application Priority Data

Mar. 25, 2002  (JP) ........................................ 2002-082345

(51) Int. Cl.[7] .............................................. G09G 5/00
(52) U.S. Cl. ........................... 345/1.1; 345/2.1; 345/806
(58) Field of Search ........................... 345/1.1–3.4, 761, 345/781, 783, 803, 804–806, 156, 157, 856

(56) References Cited

U.S. PATENT DOCUMENTS

| 4,769,762 | A | * | 9/1988 | Tsujido ........................ 345/807 |
| 5,564,002 | A | * | 10/1996 | Brown ........................ 345/778 |
| 5,694,150 | A | * | 12/1997 | Sigona et al. ................ 345/856 |
| 6,069,615 | A | * | 5/2000 | Abraham et al. ............ 345/168 |
| 6,509,911 | B1 | * | 1/2003 | Shimotono ................... 345/761 |
| 6,573,913 | B1 | * | 6/2003 | Butler et al. ................. 345/761 |
| 6,738,028 | B2 | * | 5/2004 | Asahi et al. .................. 345/1.1 |
| 6,759,996 | B1 | * | 7/2004 | Someya et al. .............. 345/1.1 |
| 2003/0179179 | A1 | * | 9/2003 | Someya ....................... 345/156 |

FOREIGN PATENT DOCUMENTS

| JP | 5-127856 A | 5/1993 |
| JP | 5-249932 A | 9/1993 |

* cited by examiner

*Primary Examiner*—Xiao Wu
(74) *Attorney, Agent, or Firm*—Birch, Stewart, Kolasch & Birch, LLP

(57) ABSTRACT

An image signal generating apparatus, method, program and information storage medium for causing display units to display individual images. The apparatus includes a signal generator sequentially generating an image signal for each frame, an indexer adding an index signal, and an output circuit transmitting the image signal. The apparatus also includes a window controller which causes the plurality of display units to display a window under control of an application software, holds display position information of the window, and controls input and output of data using the window. When the index signal added to the image signal for each frame is changed to an updated index signal, the window controller transforms the display position information of the window in accordance with the updated index signal.

18 Claims, 8 Drawing Sheets

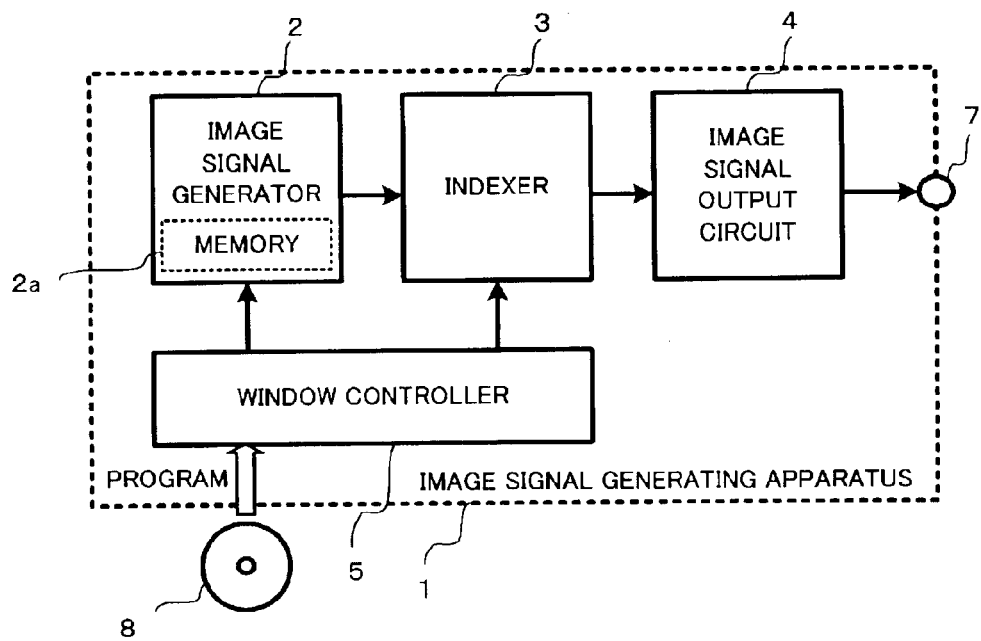
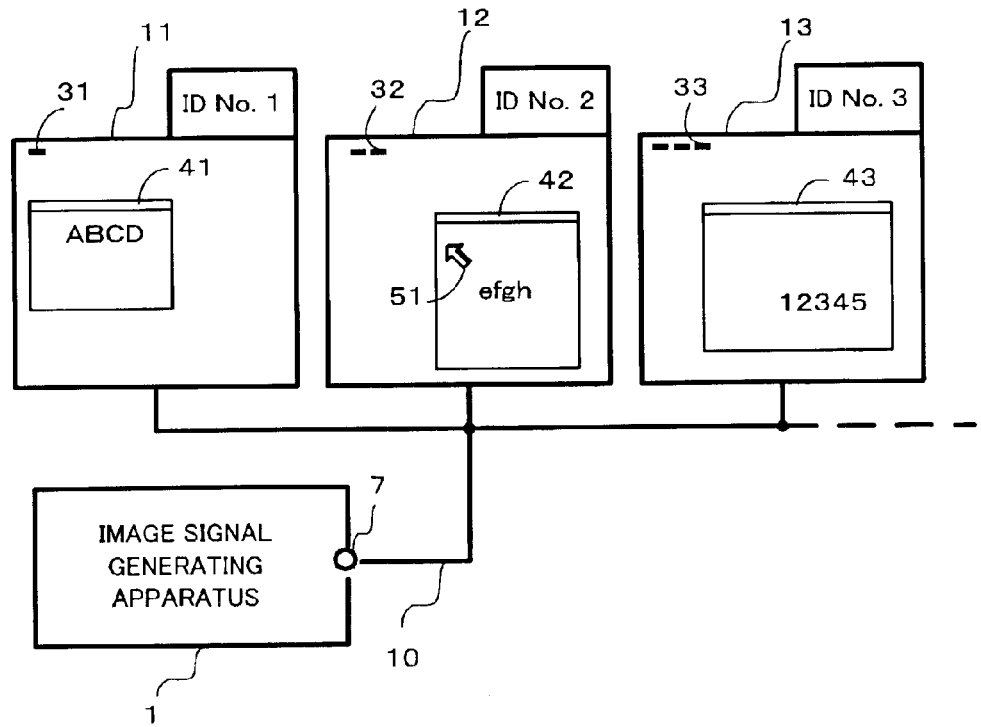

APPARATUS, METHOD AND PROGRAM FOR CAUSING A PLURALITY OF DISPLAY UNITS TO DISPLAY IMAGES

BACKGROUND OF THE INVENTION

1. Field of the Invention

The present invention relates to an image signal generating apparatus that causes a plurality of display units each having their own identification data to display individual images, an image signal generating method that is implemented by the aforementioned image signal generating apparatus, a program for causing a computer system to implement the aforementioned image signal generating method, and a computer-readable information storage medium that contains the aforementioned program.

2. Description of the Related Art

The Japanese Patent Kokai (Laid-Open) Publication No. 2000-352962 published on Dec. 19, 2000 discloses a system wherein a single image signal generating apparatus (e.g., a personal computer) causes a plurality of display units (e.g., CRT monitors or liquid crystal monitors) to display individual images. FIG. 12 schematically shows three display screens (i.e., a coordinate plane including display regions of first, second and third display units 11, 12 and 13 arranged side by side), on which images corresponding to an image signal output from the image signal generating apparatus are displayed. Further, FIG. 13 is a timing chart showing transmission timing of an image signal output from the image signal generating apparatus.

In FIG. 12, reference numerals 31, 32 and 33 denote indexes that are displayed on the display screens according to an index signal, and reference numerals 41, 42 and 43 denote windows that are displayed on the display screens under control of an application software. Further, a reference numeral 51 denotes a pointer such as a mouse pointer. Furthermore, reference numerals 71, 72 and 73 denote the display screens (or display regions) of the first, second and third display units 11, 12 and 13. The images displayed on the display screens 71, 72 and 73 corresponds to a first page image signal P1, second page image signal P2 and third page image signal P3 in FIG. 13 respectively.

Identification data (e.g., ID Numbers) are previously set for the respective display units 11, 12 and 13 to be used in this system. The image signal generating apparatus used in this system includes a memory device such as a semiconductor memory and reserves a memory space for temporally holding an image signal in the memory device. A size of the memory space corresponds to the number of pages (three in this example), which is equal to the number of the display units (three in this example) shown in FIG. 12. The image signal generating apparatus outputs the first page, second page and third page image signals P1, P2 and P3 corresponding to the respective images of the display screens 71, 72 and 73 on a time division basis as shown in FIG. 12. An index signal is added to the first page, second page and third page image signals P1, P2 and P3 for each frame. The first page, second page and third page image signals P1, P2 or P3 are sequentially supplied to all the display units 11, 12 and 13 connected to the image signal generating apparatus as shown in FIG. 12.

Each of the display units 11, 12 and 13 judges whether or not the index signal added to the received image signal P1, P2 or P3 for each frame coincides with its own identification data. The display unit 11, 12 or 13 that has an identification data coinciding with the index signal, displays an image based on the image signal P1, P2 or P3 for each frame having the index signal (i.e., the display unit rewrites the contents of its image memory). On the other hand, the display unit 11, 12 or 13 that has an identification data not coinciding with the index signal, ignores the received image signal P1, P2 or P3 for each frame having the index signal and does not change the displaying image (i.e., the display unit does not change the contents of its image memory).

In this system, only by connecting the single image signal generating apparatus and the plurality of display units by means of a connection cable or cables, a single image can be displayed on a broad area made up of the display regions of the plurality of display units, or a plurality of windows based on an application software can be displayed on the respective display regions of the plurality of display units.

As described above, in the aforementioned conventional system, the image signal generating apparatus reserves a memory space, a size of which corresponds to the number of pages (i.e., the number of display units), and switchingly outputs the first page, second page and third page image signals P1, P2 and P3 for each frame on a time division basis. Therefore, a large amount of the memory space must be reserved in the memory device of the image signal generating apparatus, thus undesirably increasing the price of the system.

SUMMARY OF THE INVENTION

It is an object of the present invention to provide an apparatus, method and program for causing a plurality of display units each having their own identification data to display individual images while eliminating the need for increasing the a memory space in a memory device of the apparatus, and a computer-readable information storage medium that stores the aforementioned program.

According to an image signal generating apparatus which transmits an image signal to a plurality of display units each having identification data, includes an image signal generator which sequentially generates an image signal for each frame that is an image signal for displaying one page image in one frame period, the one page image being an image to be displayed on each of the plurality of display units; an indexer which adds an index signal to the image signal for each frame; and an image signal output circuit which sequentially transmits the image signal for each frame to the plurality of display units, thereby causing any of the plurality of display units having identification data corresponding to the index signal added to the transmitted image signal for each frame to display an image based on the transmitted image signal for each frame. The apparatus also includes a window controller which causes the plurality of display units to display a window under control of an application software, holds display position information of the window, and controls input and output of data using the window. When the index signal added to the image signal for each frame is changed to an updated index signal, the window controller transforms the display position information of the window in accordance with the updated index signal.

According to another aspect of the present invention, an image signal generating method for transmitting an image signal to a plurality of display units each having identification data, includes sequentially generating an image signal for each frame that is an image signal for displaying one page image in one frame period, the one page image being an image to be displayed on each of the plurality of display units; adding an index signal to the image signal for each frame; and sequentially transmitting the image signal for each frame to the plurality of display units, thereby causing any of the plurality of display units having identification data corresponding to the index signal added to the transmitted image signal for each frame to display an image based on the transmitted image signal for each frame. The method also includes causing the plurality of display units to display a window under control of an application software; holding display position information of the window; and controlling input and output of data using the window. When the index signal added to the image signal for each frame is changed to an updated index signal, the window controller transforms the display position information of the window in accordance with the updated index signal.

According to a further aspect of the present invention, a computer-readable information storage medium contains a program for causing a computer system to perform an image signal processing. The image signal processing includes sequentially generating an image signal for each frame that is an image signal for displaying one page image in one frame period, the one page image being an image to be displayed on each of the plurality of display units; adding an index signal to the image signal for each frame; and sequentially transmitting the image signal for each frame to the plurality of display units, thereby causing any of the plurality of display units having identification data corresponding to the index signal added to the transmitted image signal for each frame to display an image based on the transmitted image signal for each frame. The image signal processing further includes causing the plurality of display units to display a window under control of an application software; holding display position information of the window; and controlling input and output of data using the window. When the index signal added to the image signal for each frame is changed to an updated index signal, the window controller transforms the display position information of the window in accordance with the updated index signal.

According to a yet further aspect of the present invention, a program causes a computer system to perform an image signal processing. The image signal processing includes sequentially generating an image signal for each frame that is an image signal for displaying one page image in one frame period, the one page image being an image to be displayed on each of the plurality of display units; adding an index signal to the image signal for each frame; and sequentially transmitting the image signal for each frame to the plurality of display units, thereby causing any of the plurality of display units having identification data corresponding to the index signal added to the transmitted image signal for each frame to display an image based on the transmitted image signal for each frame. The image signal processing further includes causing the plurality of display units to display a window under control of an application software; holding display position information of the window; and controlling input and output of data using the window. When the index signal added to the image signal for each frame is changed to an updated index signal, the window controller transforms the display position information of the window in accordance with the updated index signal.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 1 is a schematic block diagram showing a configuration of an image signal generating apparatus in accordance with a first or second embodiment of the present invention;

FIG. 2 is a diagram showing the image signal generating apparatus of FIG. 1 and a plurality of display units connected to the image signal generating apparatus of FIG. 1;

DETAILED DESCRIPTION OF THE INVENTION

Figure 3:
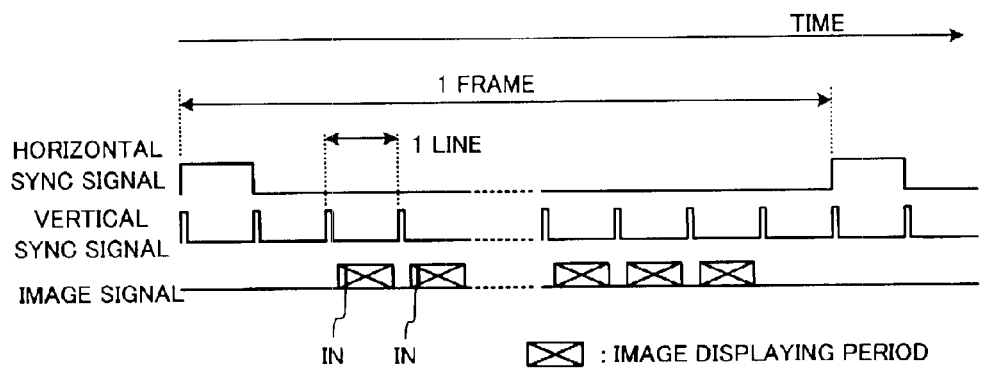
FIG. 3 is a timing chart for explaining how to add an index signal to an image signal for each frame in the image signal generating apparatus of FIG. 1.

Further scope of applicability of the present invention will become apparent from the detailed description given hereinafter. However, it should be understood that the detailed description and specific examples, while indicating preferred embodiments of the invention, are given by way of illustration only, since various changes and modifications will become apparent to those skilled in the art from the detailed description.

First Embodiment

FIG. 1 shows a configuration of an image signal generating apparatus 1 in accordance with the first embodiment of the present invention (or an apparatus that implements an image signal generating method in accordance with the first embodiment). Further, FIG. 2 shows the image signal generating apparatus 1 in accordance with the first embodiment and first, second and third display units 11, 12 and 13 connected to the image signal generating apparatus 1.

The image signal generating apparatus 1 is, for example, a personal computer. The first, second and third display units 11, 12 and 13 are, for example, monitors connected to the image signal generating apparatus 1 by a connection cable 10 or other means such as a wireless communication. Although three display units 11, 12 and 13 are illustrated in FIG. 2, the number of the display units to be connected to the image signal generating apparatus 1 may be two or less, or four or more. Further, the connection cable 10 is branched halfway (e.g., by a distributor) in FIG. 2. However, if each display unit has not only an input terminal for receiving an image signal but also an output terminal for outputting the received image signal, the image signal generating apparatus 1 and the display units 11, 12 and 13 can be connected in series by connection cables.

Referring to FIG. 2, the display units 11, 12 and 13 hold different identification data such as ID No.1, ID No.2 and ID No.3 respectively. In this way, in the first embodiment, by connecting an output terminal 7 of the image signal generating apparatus 1 with one end of the connection cable 10 and connecting the display units 11, 12 and 13 with the other ends of the connection cable 10, different images can be displayed on the respective display units 11, 12 and 13. When it is desired to display an identical image on some of the display units, it is only required to set identical identification data for such display units.

Referring to FIG. 1, the image signal generating apparatus 1 includes an image signal generator 2, an indexer 3, an image signal output circuit 4, a window controller 5, and an output terminal 7. The constituent elements 2 through 5 incorporated into the image signal generating apparatus 1 are parts necessary for explaining the function of the image signal generating apparatus 1and are illustrated separately. However, these parts are not always required to be provided as clearly separated in an actual circuit configuration. Further, the operations of the image signal generator 2, indexer 3 and window controller 5 are executed under control of a computer program previously installed in the window controller 5, under control of a computer program installed from a computer-readable information storage medium 8 such as a magnetic disk or an optical disk, or under control of a computer program installed through download from the Internet or the like.

Assume that one page (or one page image) is an image to be displayed on one of the display units 11, 12 and 13, the image signal generator 2 generates and outputs sequentially an image signal for each frame for displaying the one page image. In other words, the image signal generator 2 generates and outputs an image signal for displaying one page image from one frame to another. The image signal is generated, for example, under control of an application software. The image signal includes, for example, information about a plurality of windows 41, 42 and 43 for input and output of data, and information about a single image to be displayed on a broad display area made up of the display regions of the display units 11, 12 and 13.

The indexer 3 adds an index signal to an image signal for each frame output from the image signal generator 2. The index signal is a signal corresponding to identification data (such as an identification number) previously set (e.g., by an exclusive switch, dial or through operation of a menu on the display screen) for each of the display units 11, 12 and 13. The addition of the index signal by the indexer 3 is carried out by adding an index signal to an image signal for each frame or by replacing a part of an image signal for each frame with an index signal. The index signal is represented, for example, by a combination of maximum and minimum values of a gray scale representation.

The image signal output circuit 4 transmits an image signal for each frame to the plurality of display units 11, 12 and 13 through the output terminal 7. The format of the output signal of the image signal output circuit 4 may be any one of an analog format, a transmission minimized differential signaling (TMDS) format, a low voltage differential signaling (LVDS) format, and a digital signal format such as an optical signal format.

The window controller 5 controls the image signal generator 2 and indexer 3. The window controller 5, under control of an application software, displays the windows 41, 42 and 43 on the plurality of display units 11, 12 and 13, holds display position information of the windows 41, 42 and 43, and controls input and output of data using the windows 41, 42 and 43. When the index signal added to the image signal for each frame is changed to an updated index signal, the window controller 5 transforms the display position information of the window 41, 42 and 43 in accordance with the updated index signal. The page changeover methods includes a method wherein the page is changed when a graphical user interface is used for the page changeover (e.g., a button for the page changeover displayed on the display screen is pushed), and a method wherein the page is changed when the pointer 51 is moved to an end of the display screen (i.e., when the pointer comes across the boundary between the adjacent display regions).

FIG. 3 is a timing chart for explaining how to add an index signal IN to an image signal for each frame in the image signal generating apparatus 1 in accordance with the first embodiment. FIG. 3 shows an example when a part of an image signal for each frame (within an image displaying period) between two lines at a predetermined position in one frame is replaced with an index signal IN. As shown in FIG. 3, the indexer 3 adds the index signal to the image signal for each frame by replacing a part of the image signal by the index signal IN at the predetermined position during the image displaying period. Since a part of the image signal during the image displaying period is replaced with the index signal IN (i.e., the index signal IN is superposed), images (e.g., images denoted by reference numerals 31, 32 and 33 in FIG. 2) corresponding to the index signal IN appear in the display regions of the display units 11, 12 and 13. For this reason, it is desirable that the images corresponding to the index signal IN be displayed at unnoticeable positions (e.g., in the vicinity of corners of the display regions) in the display regions. Further, the index signal may be transmitted during a non-displayed interval or blanking interval of the image signal.

Figure 4:
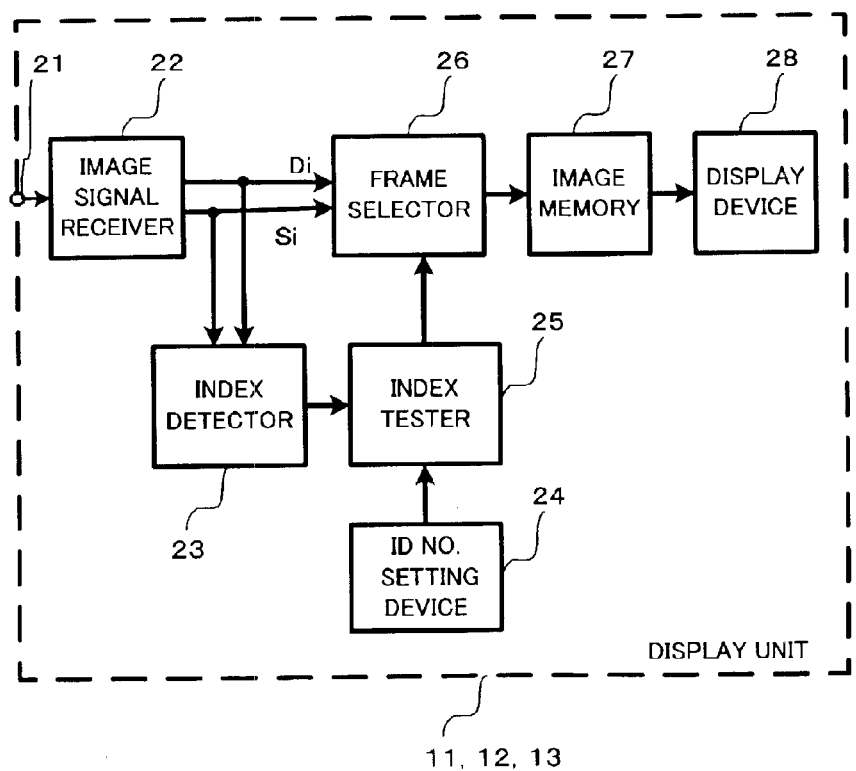
FIG. 4 is a schematic block diagram showing a configuration of a display unit to be connected to the image signal generating apparatus of FIG. 1.

FIG. 4 is a schematic block diagram showing a configuration of the display unit 11, 12 or 13 to be connected to the image signal generating apparatus 1 in accordance with the first embodiment. Referring to FIG. 4, each of the display units 11, 12 and 13 includes an input terminal 21, an image signal receiver 22, an index detector 23 for binarizing a received index signal on the basis of a preset threshold value, an identification number setting device 24 for setting identification numbers for the display units 11, 12 and 13, and an index tester 25 for determining whether or not the index signal added to an image signal for each frame corresponds to the identification number set in the corresponding display unit.

Each of the display units 11, 12 and 13 further includes a frame selector 26 for determining whether or not the frame is sent to an image memory 27 on the basis of a judgement result of the index tester 25, the aforementioned image memory 27, and a display device 28. In FIG. 4, a reference symbol Di denotes an image signal output from the image signal receiver 22, and Si denotes a synchronizing signal output from the image signal receiver 22. With such a configuration, when the index signal added to an image signal for each frame corresponds to the set identification number, each of the display unit 11, 12 and 13 stores the image signal for one frame in the image memory 27 and displays it on the display device 28.

Figure 5:
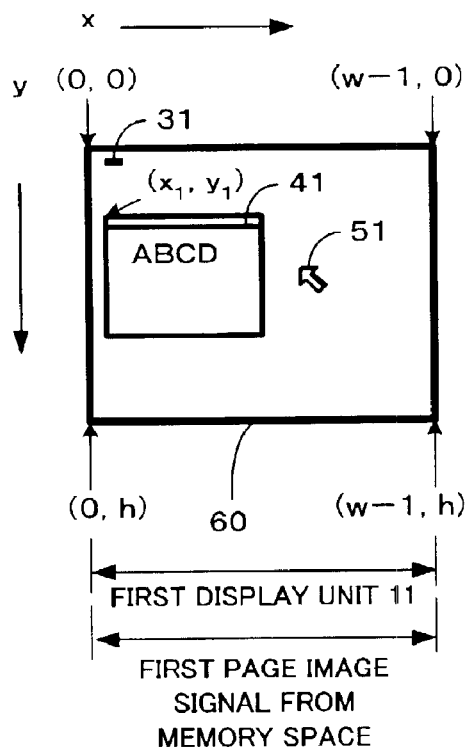
FIG. 5 is a diagram for explaining an image signal that is transmitted from the image signal generating apparatus to the plurality of display units and causes a first display unit to display a first page image.

FIG. 5 is a diagram showing a first page image displayed on the first display unit 11 based on an image signal output from the image signal generating apparatus 1 and attached with the first index 31. In FIG. 5, a region 60 shown by a solid line indicates the entire image displayed based on the image signal output through the output terminal 7 of the image signal generating apparatus 1. The number of pixels in the one page display region (i.e., display screen) of the first display unit 11 is "w" pixels ("w" being a positive integer) in a horizontal direction by "h" pixels ("h" being a positive integer) in a vertical direction. A position on the display region of the first display unit 11 is represented by a coordinate in a coordinate system having an origin (0, 0) at an upper left corner of the display region of the first display unit 11 and having an x-axis extending in a horizontal rightward direction and a y-axis extending in a vertical downward direction. However, the position of the origin and the directions of the coordinate axes are not limited to the above example.

The image signal generator 2 generates a first page image signal in such a manner that the window 41 has a coordinate $(x_1, y_1)$ at an upper left corner thereof. The indexer 3 adds the first page index signal (shown in FIG. 3 as a symbol IN) to the first page image signal at a predetermined position. As a result, the first index 31 is displayed at a predetermined position on the display region (e.g., at an upper left position in the display screen). When the first page image signal shown in FIG. 5 is output through the output terminal 7 from a memory space reserved in the memory device 2a of the image signal generator 2, a size of the memory space corresponding to one page image, the first display unit 11 having an ID No. 1 displays an image based on the image signal from the memory space reserved in a memory device 2a of the image signal generator 2.

Figure 6:
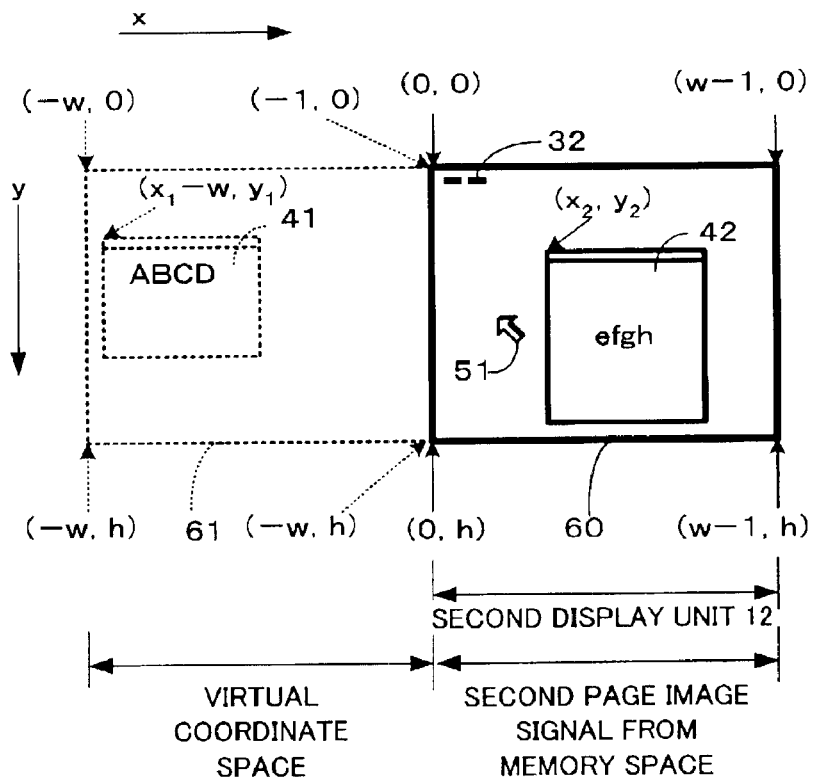
FIG. 6 is a diagram for explaining an image signal that is transmitted from the image signal generating apparatus to the plurality of display units and causes a second display unit to display a second page image.

FIG. 6 is a diagram showing a second page image displayed on the second display unit 12 based on an image signal output from the image signal generating apparatus 1 and attached with the second index 32. In FIG. 6, a region 60 shown by a solid line indicates the entire image displayed based on the image signal output from the output terminal 7. The number of pixels in the one page display region (i.e., display screen) of the second display unit 12 is "w" pixels in a horizontal direction by "h" pixels in a vertical direction. A position on the display region of the second display unit 12 is represented by a coordinate in a coordinate system having an origin (0,0) at an upper left corner of the display region of the second display unit 12 and having an x-axis extending in a horizontal rightward direction and a y-axis extending in a vertical downward direction. However, the position of the origin and the directions of the coordinate axes are not limited to the above example.

The image signal generator 2 generates a second page image signal in such a manner that the window 42 has a coordinate $(x_2, y_2)$ at an upper left corner thereof. The indexer 3 adds the second page index signal to the second page image signal at a predetermined position. As a result, the second index 32 is displayed at a predetermined position on the display region (e.g., at an upper left position in the display screen). When the second page image signal shown in FIG. 6 is output through the output terminal 7 from the memory space of the image signal generator 2, a size of the memory space corresponding to one page image, the second display unit 12 having an ID No. 2 displays an image based on the image signal from the memory space reserved in a memory device 2a of the image signal generator 2.

In FIG. 6, a region 61 shown by a broken line indicates a virtual coordinate space that is used for explaining the generating operation of an image signal of more than one page. When the second page image signal (i.e., the region 60) is output from the image signal generator 2, the window controller 5 holds display position information of the window 41 to be displayed on the display screen of the second display unit 12. The held display position information is a coordinate $(x_1-w, y_1)$ obtained by moving (i.e., coordinate-transforming) a coordinate $(x_1, y_1)$ leftwards by "w". The image signal generator 2 then generates an image signal for displaying a window 42 to be displayed on the second page at a coordinate $(x_2, y_2)$ The indexer 3 changes display unit selection information from the first page index signal to the second page index signal. When the coordinate of the window 41 is transformed to the coordinate $(x_1-w, y_1)$ by the window controller 5, the window 41 is moved outside of the coordinate space (i.e., outside the region 60) of the second page, which results in that an image signal of the window 41 will not be output from the image signal generating apparatus 1. The second display unit 12 displays an image based on the second page image signal output from the image signal generating apparatus 1, and the first display unit 11 continues to display an image based on the image signal held in its image memory (denoted by reference numeral 27 in FIG. 4) as the first page image.

Figure 7:
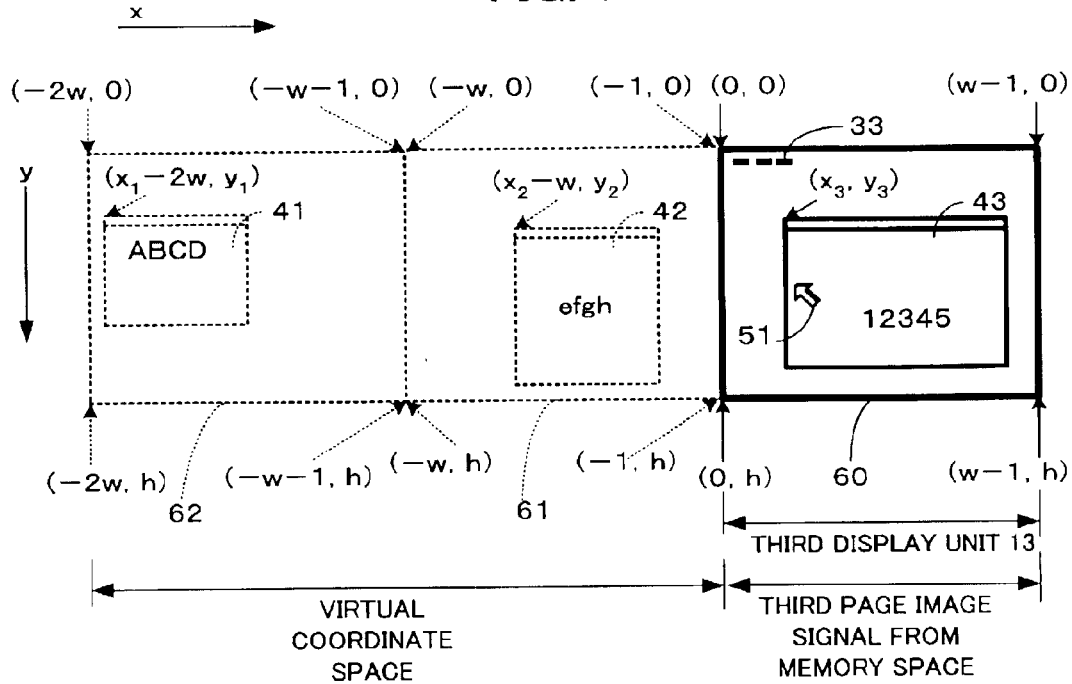
FIG. 7 is a diagram for explaining an image signal that is transmitted from the image signal generating apparatus to the plurality of display units and causes a third display unit to display a third page image.

FIG. 7 is a diagram showing a third page image displayed on the third display unit 13 based on an image signal output from the image signal generating apparatus 1 and attached with the third index 33. In FIG. 7, a region 60 shown by a solid line indicates the entire image displayed based on the image signal output through the output terminal 7 of the image signal generating apparatus 1. The number of pixels in the one page display region of the third display unit 13 is "w" pixels in a horizontal direction by "h" pixels in a vertical direction. A position on the display region of the third display unit 13 is represented by a coordinate in a coordinate system having an origin (0, 0) at an upper left corner of the display region of the third display unit 13 and having an x-axis extending in a horizontal rightward direction and a y-axis extending in a vertical downward direction. However, the position of the origin and the directions of the coordinate axes are not limited to the above example.

The image signal generator 2 generates a third page image signal in such a manner that a window 43 has a coordinate $(x_3, y_3)$ at an upper left corner thereof. The indexer 3 adds the third index signal to the third page image signal at a predetermined position. As a result, the third index 33 is displayed at a predetermined position on the display region (e.g., at an upper left position in the display screen). When the third page image signal shown in FIG. 7 is output through the output terminal 7 from the memory space of the image signal generator 2, a size of the memory space corresponding to one page image, the third display unit 13 having an ID No. 3 displays an image based on the image signal from the memory space reserved in a memory device 2a of the image signal generator 2.

In FIG. 7, regions 61 and 62 shown by broken lines indicate virtual coordinate spaces that is used for explaining the generating operation of an image signal of more than one page. When the image signal generator 2 outputs the third page image signal, the window controller 5 holds display position information of the window 41 to be displayed on the display screen of the first display unit 11 and display position information of the window 42 to be displayed on the display screen of the second display unit 12. The held display position information are a coordinate $(x_1-2w, y_1)$ obtained by moving (i.e., coordinate-transforming) the coordinate $(x_1, y_1)$ leftwards by "2w" and a coordinate $(x_2-w, y_2)$ obtained by moving the coordinate $(x_2, y_2)$ leftwards by "w". The image signal generator 2 generates an image signal for displaying a window 43 on the display screen of the third display unit 13 at a coordinate $(x_3, y_3)$. The indexer 3 changes the display unit selection information from the second page index signal to the third page index signal. Since the movement of the window 42 to the coordinate $(x_2-w, y_2)$ by the window controller 5 causes the window 42 to be moved outside of the coordinate space (i.e., the region 60) of the third page, the image signal generating apparatus 1 will not output an image signal for displaying the window 42. The third display unit 13 displays an image based on the third page image signal output from the image signal generating apparatus 1, the first display unit 11 continues to display an image based on the image signal held in its image memory (denoted by numeral 27 in FIG. 4) thereon as the first page image, and the second display unit 12 continues to display an image based on the image signal held in its image memory (denoted by numeral 27 in FIG. 4) thereon as the second page image.

Figure 8:
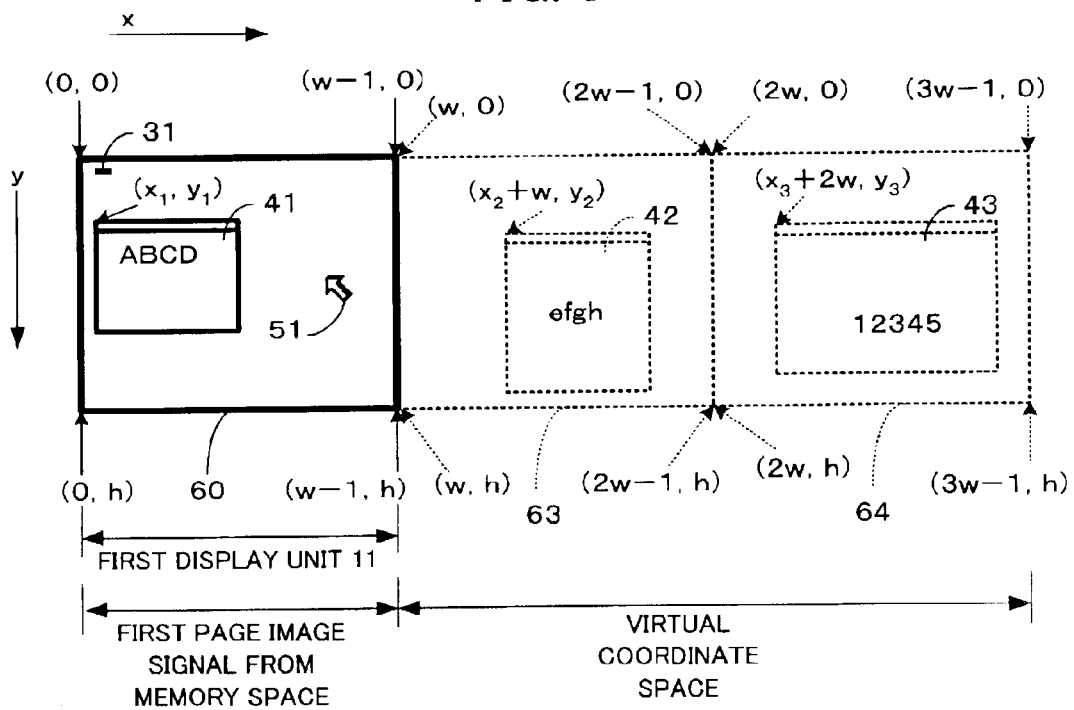
FIG. 8 is a diagram for explaining an image signal that is transmitted from the image signal generating apparatus to the plurality of display units and causes a first display unit to display a first page image.

FIG. 8 is a diagram for explaining the operation when the image signal output from the image signal generating apparatus 1 is switched from the third page image signal to the first page image signal. In FIG. 8, regions 63 and 64 shown by broken lines indicate virtual coordinate spaces that are used for explaining the generating operation of more than one page. When the image signal is switched from the third page image signal to the first page image signal, the window controller 5 holds display position information of the window 42 to be displayed on the display screen of the second display unit 12 and display position information of the window 43 to be displayed on the display screen of the third display unit 12. The window controller 5 changes (coordinate-transforms) the coordinate of the window 41 to the coordinate $(x_1, y_1)$, changes the coordinate of the window 42 to a coordinate $(x_2+w, y_2)$, and changes the coordinate of the window 43 to a coordinate $(x_3+2w, y_3)$. The indexer 3 changes the display unit selection information from the third page index signal to the first page index signal. Since the window controller 5 moves the window 41 to the coordinate $(x_1, y_1)$, the window 42 to the coordinate $(x_2+w, y_2)$, and the window 43 to the coordinate $(x_3+2w, y_3)$, the window 41 is moved into the coordinate space (i.e., the region 60) of the first page, thus resulting in that the image signal of the window 41 is output from the image signal generating apparatus 1.

Figure 9:
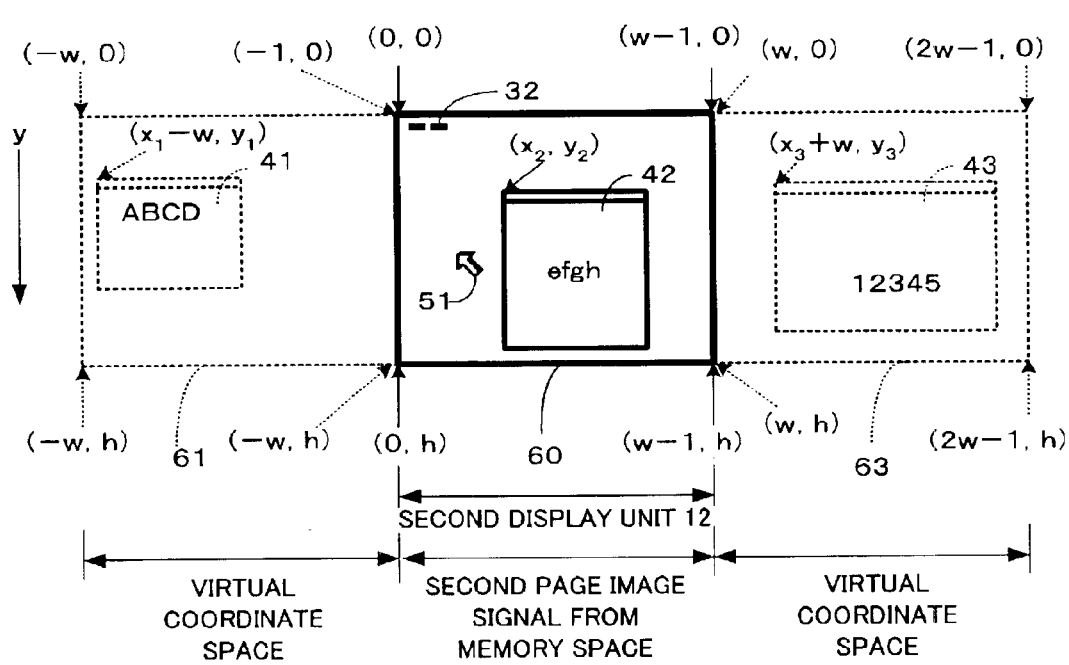
FIG. 9 is a diagram for explaining an image signal that is transmitted from the image signal generating apparatus to the plurality of display units and causes a second display unit to display a second page image.

FIG. 9 is a diagram for explaining the operation when the image signal output from the image signal generating apparatus 1 is switched from the first page image signal to the second page image signal. In FIG. 9, regions 61 and 63 shown by broken lines indicate virtual coordinate spaces that are used for explaining the generating operation of more than one page. When the image signal is switched from the first page image signal to the second page image signal, the window controller 5 holds display position information of the window 41 to be displayed on the display screen of the first display unit 11 and display position information of the window 43 to be displayed on the display screen of the third display unit 13. The window controller 5 changes the coordinate of the window 41 to the coordinate $(x_1-w, y_1)$, the coordinate of the window 42 to the coordinate $(x_2, y_2)$, and the coordinate of the window 43 to the coordinate $(x_3+w, y_3)$. The indexer 3 changes the display unit selection information from the first page index signal to the second page index signal. Since the window controller 5 moves the window 41 to a coordinate $(x_1-w, y_1)$, the window 42 to the coordinate $(x_2, y_2)$, and the window 43 to the coordinate $(x_3+W, y_3)$, the window 42 is moved into the coordinate space (i.e., the region 60) of the second page, thus resulting in that the image signal including the window 42 is output from the image signal generating apparatus 1.

As has been explained above, when a page number to be displayed is increased by "m" pages starting with the current page number, a coordinate value in the horizontal direction is subtracted by "w×m"; whereas, when the page number is decreased by "m" pages, the coordinate value in the horizontal direction is added by "w×m". When the amount of movement in the coordinate value is represented by the number of pixels of one page in the horizontal direction in this way, the window control can be realized only by adding a value "w×(PNb−PNa)", where "w" denotes the number of pixels in the horizontal direction, "PNb" denotes the page number before the page changeover, and "PNa" denotes the page number after the page changeover.

In this connection, control may be carried out so that the coordinate of each window and a page number to be displayed on each window are held to move the coordinate of the window to be displayed into the coordinate space 60.

Figure 10:
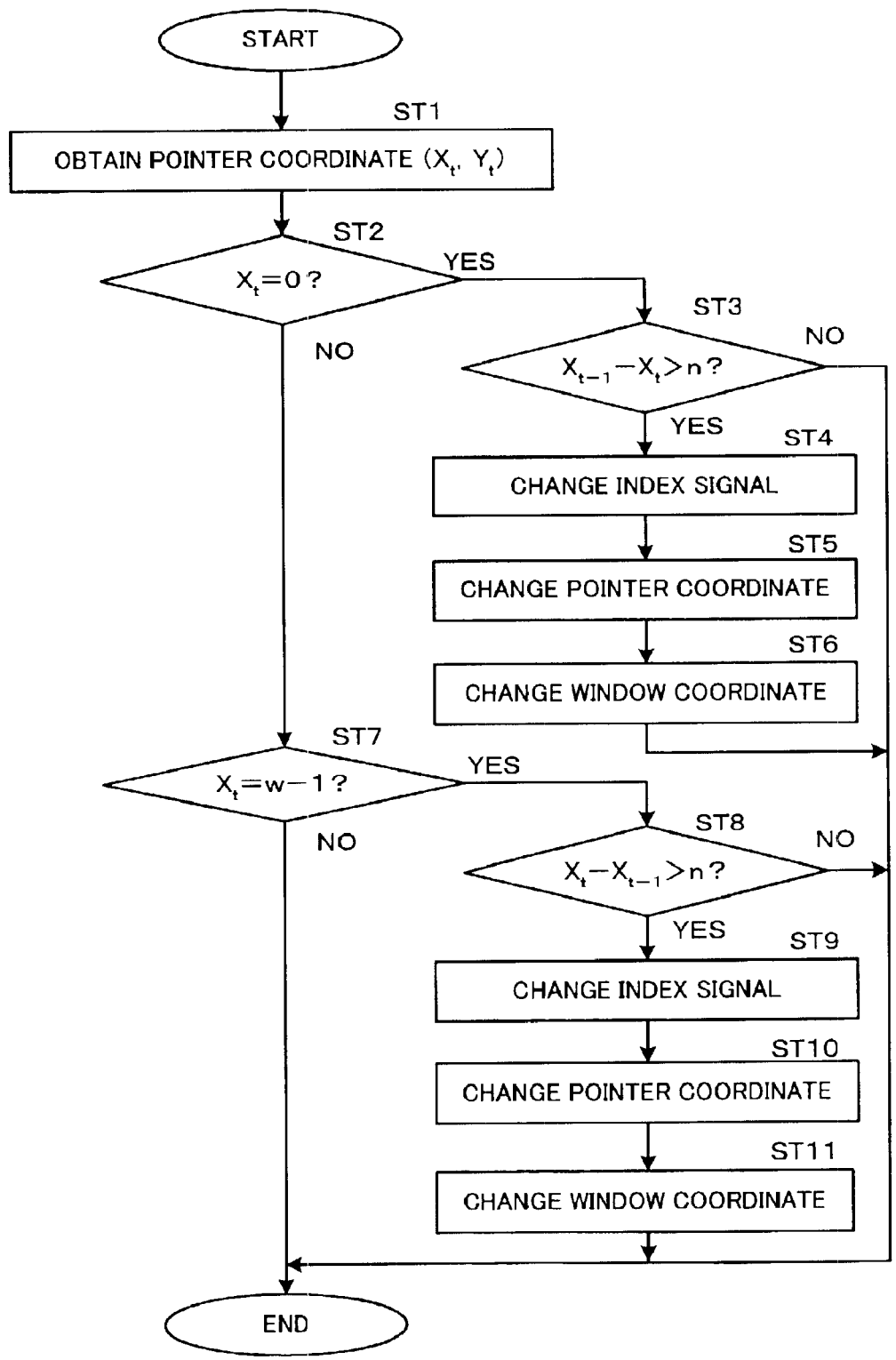
FIG. 10 is a flowchart for explaining window control in the image signal generating apparatus in accordance with the first embodiment.

FIG. 10 is a flowchart showing the window control in the page changeover operation of the image signal generating apparatus 1 in accordance with the first embodiment. FIG. 10 shows the operation when an image signal output from the image signal generating apparatus 1 is switched from one page to another according to the position of the pointer 51.

As shown in FIG. 10, the window controller 5 obtains a coordinate $(X_t, Y_t)$ of the pointer 51 on the display screen in a step ST1. In this case, $X_t$ denotes a coordinate value in a horizontal direction at a time "t", and $Y_t$ denotes a coordinate value in a vertical direction at the time "t". In a step ST2, the window controller 5 judges whether or not the position $X_t$ of the pointer 51 obtained in the step ST1 is 0. When $X_t$ is equal to 0 (i.e., when the position of the pointer 51 is on the boundary between the adjacent display regions) in the step ST1, the process proceeds to a step ST3. When $X_t$ is other than 0 (i.e., when the position of the pointer 51 is not on the boundary between the adjacent display regions), the process proceeds to a step ST7.

When the process proceeds to the step ST3, the window controller 5 judges whether a condition $X_{t-1}-X_t>n$ is satisfied or not with use of the coordinate $(X_{t-1}, Y_{t-1})$ of the pointer 51 obtained at a time "t−1". When the judgement is YES (when the pointer 51 reaches the boundary through movement faster than a set speed) in the step ST3, the process proceeds to a step ST4 and the window controller 5 starts the page changeover operation. When the judgement is NO in the step ST3 (when the pointer 51 reaches the boundary through movement slower than the set speed), the window controller 5 terminates the window control. In this case, "n" is set at a value corresponding to the amount of movement per unit time in the pointer 51 as a condition at the time of the page changeover. When "n" is one or less, the page changeover operation occurs always when the pointer 51 moved to an end of the display screen. Thus it is generally desirable to set "n" at two or more.

In the step ST4, the window controller 5 changes display unit selection information in such a manner as, for example, to decrease the page number (which corresponds to a case where a changeover is carried out, e.g., from FIG. 9 to FIG. 8). In this case, in a next step ST5, the window controller 5 changes the coordinate of the pointer 51 from (0, $Y_t$) to (w−1, $Y_t$) to change the display position of the pointer 51 from the left end of the display screen to the right end of the display screen (e.g., from the left end of the region 60 in FIG. 9 to the right end of the region 60 in FIG. 8). In a next step ST6, the window controller 5 controls each window in such a manner as mentioned above, thus changing the coordinates of the windows to be displayed on each screen.

Meanwhile, when $X_t$ is equal to 0 in the step ST2, the process proceeds to a step ST7 and the window controller 5 judges whether a condition $X_t$=w−1 is satisfied or not in the step ST7. When the judgement is YES in the step ST7, the process proceeds to a step ST8. When the judgement is NO in the step ST7, the window controller 5 terminates its window control operation. In a step ST8, the window controller 5 judges whether a condition $X_t-X_{t-1}$>n is satisfied or not with use of the coordinate ($X_{t-1}$, $Y_{t-1}$) of the pointer 51 obtained at a time "t−1" in the step ST3. When the judgement is YES (i.e., when the pointer 51 reaches the boundary through movement faster than a set speed), the process proceeds to a step ST9 and the window controller 5 starts the page changeover operation. When the judgement is NO (i.e., when the pointer 51 reaches the boundary through movement slower than the set speed), the window controller 5 terminates its window control operation.

In the step ST9, the window controller 5 changes the display unit selection information so as to, e.g., increase the page number (which corresponds to a case where a change is made, e.g., from FIG. 8 to FIG. 9). In a next step ST10, the window controller 5 changes the coordinate of the pointer 51 from (w−1, $Y_t$) to (0, $Y_t$) (i.e., changes the coordinate of the pointer 51, e.g., from the right end of the region 60 in FIG. 8 to the left end of the region 60 in FIG. 9). In a next step ST11, the window controller 5 controls the coordinate of each window as mentioned above to thereby change the coordinate of the window to be displayed on each display screen.

When the operation shown in the flowchart of the window control mentioned above is carried out at constant intervals, the page changeover can be performed based on the position of the pointer 51.

As has been mentioned in the foregoing, according to the image signal generating apparatus of the first embodiment or the image signal generating method, the coordinates of the windows 41, 42 and 43 to be displayed on each display screen are controlled as associated with the indexes. Therefore, a large amount of memory space is not required, an image signal corresponding to a plurality of pages can be generated, and page changeover can be realized while eliminating the need for changing the memory space at high speed or for transmitting a lot of image data to an image memory space.

Further, since the amount of change in the coordinate of the window is an integral multiple of the number of horizontal or vertical pixels in one display screen, the window control can be easily carried out.

In addition, since the page changeover is carried out according to the display position of the pointer such as a mouse pointer, the page changeover operation can be easily realized.

Second Embodiment

Figure 11:
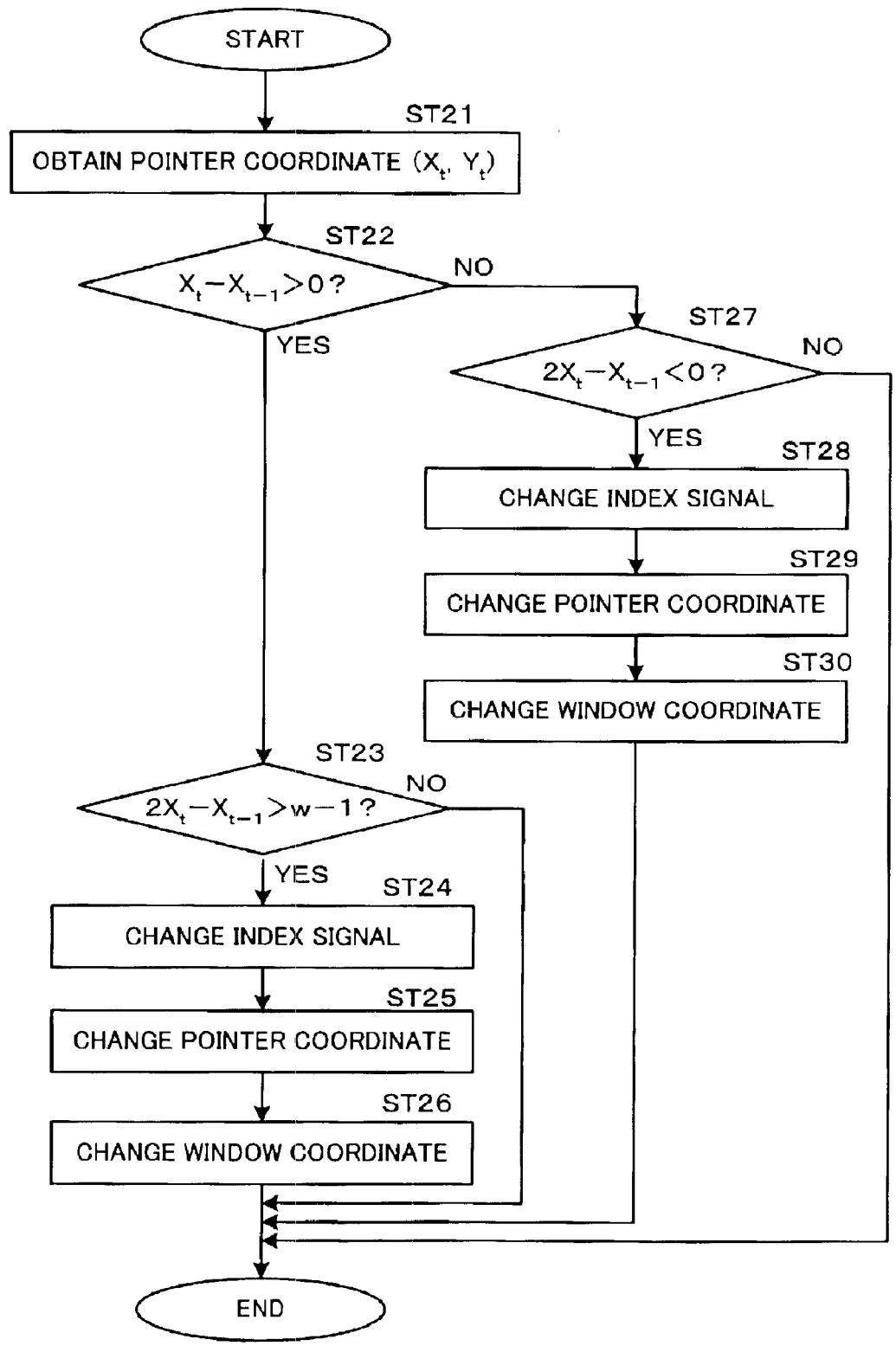
FIG. 11 is a flowchart for explaining window control in an image signal generating apparatus in accordance with the second embodiment of the present invention.
Figure 12:
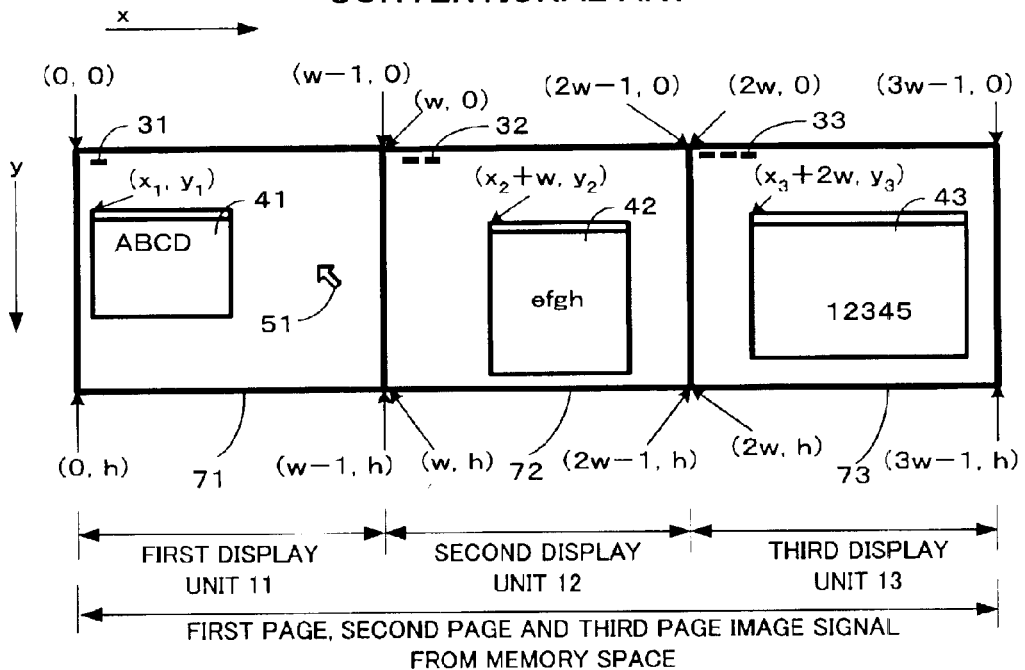
FIG. 12 schematically shows three display screens, on which images corresponding to an image signal output from the conventional image signal generating apparatus are displayed.
Figure 13:
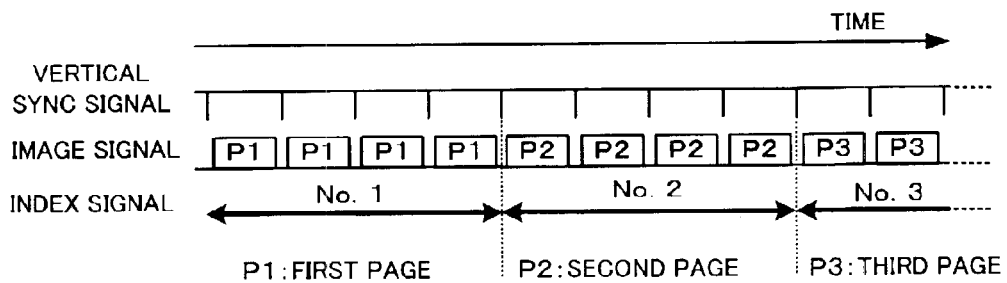
FIG. 13 is a timing chart showing transmission timing of an image signal output from the conventional image signal generating apparatus.

An image signal generating apparatus and method for generating an image signal in accordance with a second embodiment are the same as those in accordance with the first embodiment, except for a relation between the coordinate of the pointer 51 and the display page changeover. Accordingly the second embodiment will be explained by referring also to FIGS. 1 through 9. FIG. 11 is a flowchart showing the window control in the page changeover operation of the image signal generating apparatus in accordance with the second embodiment of the present invention.

As shown in FIG. 11, in a step ST21, the window controller 5 obtains the coordinate ($X_t$, $Y_t$) of a pointer 51 on the display screen. In this case, $X_t$ denotes a coordinate value in a horizontal direction at a time "t", and $Y_t$ denotes a coordinate value in a vertical direction at the time "t". In a step ST22, the window controller 5 judges whether a condition $X_t-X_{t-1}$>0 is satisfied or not. If the condition $X_t-X_{t-1}$>0 is satisfied, the process proceeds to a step ST23. Otherwise, the process proceeds to a step ST27.

When the process proceeds to the step ST23, the window controller 5 judges whether a condition $2X_t-X_{t-1}$>w−1 is satisfied or not with use of the coordinate ($X_{t-1}$, $Y_{t-1}$) of the pointer 51 obtained at a time "t−1". When the judgement is YES in the step ST23, the process proceeds to a step ST24 to perform the page changeover operation by changing the index signal. When the judgement is NO in the step ST23, the window controller 5 terminates its window control operation.

In the step ST24, the window controller 5 changes the display unit selection information so as, e.g., to increase the page number (which corresponds to a case where a page changeover is made from FIG. 8 to FIG. 9). In a next step ST25, in this case, the window controller 5 changes the coordinate of the pointer 51 from ($X_t$, $Y_t$) to ($2X_t-X_{t-1}$−w, $Y_t$) to change the display position of the pointer 51 from the right side of the display screen to the left side the display screen (e.g., changes the display position from the right end of the region 60 in FIG. 8 to the left end of the region 60 in FIG. 9). In a next step ST26, the coordinate of each window is controlled in such a manner as mentioned above, thus changing the coordinate of the window to be displayed on each display screen.

In the step ST27, on the other hand, the window controller 5 judges whether a condition $2X_t-X_{t-1}$<0 is satisfied or not. When the judgement is YES in the step ST27, the process proceeds to a step ST28. When the judgement is NO in the step ST27, the window controller 5 terminates its window control operation.

In the step ST28, the window controller 5 changes the display unit selection information so as, e.g., to decrease the page number (which corresponds to a case where a page changeover is made, e.g., from FIG. 9 to FIG. 8). In a next step ST29, the window controller 5 changes the coordinate of the pointer 51 from ($X_t$, $Y_t$) to (w+$2X_t-X_{t-1}$, $Y_t$) to change the display position of the pointer 51 from the left side of the display screen to the right side of the display screen (for example, changes the display position from the left end of the region 60 in FIG. 9 to the right end of the region 60 in FIG. 8). In a next step ST30, the coordinate of each window is controlled in such a manner as mentioned above, thus changing the window to be displayed on each display screen.

When the operation shown in the flowchart of the window control mentioned above is carried out at constant time intervals, the page changeover can be performed based on the position of the pointer 51.

With such a configuration as explained above, it is necessary to reserve a memory space in the memory device 2a of the image signal generator 2 only for the coordinate space indicative of the entire image signal output from the output terminal 7. Therefore, it is unnecessary to reserve a memory apace in the memory device 2a of the image signal generator 2 for a virtual coordinate space. Thus the image signal generating apparatus 1 can generate an image signal corresponding to a plurality of pages while eliminating the need for a large amount of memory space. Further, the page changeover is only required to control the coordinate of the window to be displayed without changing the entire page. Thus the need for changing the memory space at high speed can be eliminated, and further the need for transmitting a lot of image data to the image memory space can be removed.

The explanation has been made in connection with the case where the virtual coordinate spaces are arranged on left and/or right sides of an actual coordinate space in the foregoing first and second embodiments. However, even when the virtual coordinate spaces are arranged on upper and/or lower sides of the actual coordinate space, substantially the same effects can be obtained. Further, the virtual coordinate spaces may be arranged in a two-dimensional positional relationship.

The explanation has been made in connection with the case where the virtual coordinate spaces are arranged on the left and right sides of the actual coordinate space and the page changeover takes place when the mouse pointer reaches the left or right end of the display screen in the foregoing first and second embodiments. However, such a configuration may be possible that the virtual coordinate spaces are arranged on the upper and lower sides of the actual coordinate space and the page changeover takes place when the mouse pointer reaches the upper or lower ends thereof.

In the foregoing first and second embodiments, further, the explanation has been made in connection with the case where the amount of movement of the window caused by the window control is an integral multiple of the number of horizontal pixels in the display screen. However, the coordinate control may be carried out so that the window not displayed is moved outside of the coordinate space to be actually displayed.

Furthermore, the explanation has been made in connection with the case where the coordinate of the window, whose display coordinate is obtained as window information and not displayed, is moved outside of the actual coordinate space in the foregoing first and second embodiments. However, such control may also be employed that the size of the window is obtained and the size of the window not displayed becomes zero.

The invention being thus described, it will be obvious that the same may be varied in many ways. Such variations are not to be regarded as a departure from the spirit and scope of the invention, and all such modifications as would be obvious to one skilled in the art are, intended to be included within the scope of following claims.

What is claimed is:

1. An image signal generating apparatus which transmits an image signal to a plurality of display units each having identification data, comprising:

an image signal generator which sequentially generates an image signal for each frame that is an image signal for displaying one page image in one frame period, the one page image being an image to be displayed on each of the plurality of display units;

an indexer which adds an index signal to the image signal for each frame;

an image signal output circuit which sequentially transmits the image signal for each frame to the plurality of display units, thereby causing any of the plurality of display units having identification data corresponding to the index signal added to the transmitted image signal for each frame to display an image based on the transmitted image signal for each frame; and a window controller which causes the plurality of display units to display a window under control of an application software, holds display position information of the window, and controls input and output of data using the window;

wherein, when the index signal added to the image signal for each frame is changed to an updated index signal, the window controller transforms the display position information of the window in accordance with the updated index signal.

2. The image signal generating apparatus according to claim 1, wherein the display position information is represented by a coordinate in a coordinate system placed on a plane including display regions of the plurality of display units arranged in accordance with the identification data.

3. The image signal generating apparatus according to claim 2, wherein an origin of the coordinate system is located at a specific position in the display region of the display unit having the identification data corresponding to the index signal added to the image signal for each frame.

4. The image signal generating apparatus according to claim 3, wherein, when the index signal added to the image signal for each frame is changed to an updated index signal, the window controller changes the coordinate of the window to a new coordinate in a transformed coordinate system, an origin of which is located at a specific position of the display region of the display unit having identification data corresponding to the updated index signal.

5. The image signal generating apparatus according to claim 1, wherein, when the index signal added to the image signal for each frame is changed to an updated index signal, the window controller reduces to zero a size of the window placed at a position other than the display region of the display unit having identification data corresponding to the updated index signal.

6. The image signal generating apparatus according to claim 1, wherein, when a pointer is moved beyond a boundary between adjacent display regions of the plurality of display units, the index signal added to the image signal for each frame is changed to the updated index signal.

7. The image signal generating apparatus according to claim 6, wherein, when the index signal added to the image signal for each frame is changed to an updated index signal, the window controller changes the coordinate of the pointer to a new coordinate in a transformed coordinate system, an origin of which is located at a specific position of the display region of the display unit having identification data corresponding to the updated index signal.

8. The image signal generating apparatus according to claim 1, wherein the addition of the index signal is carried out by replacing a part of the image signal for each frame with the index signal.

9. An image signal generating method for transmitting an image signal to a plurality of display units each having identification data, comprising:

sequentially generating an image signal for each frame that is an image signal for displaying one page image in one frame period, the one page image being an image to be displayed on each of the plurality of display units;

adding an index signal to the image signal for each frame;

sequentially transmitting the image signal for each frame to the plurality of display units, thereby causing any of the plurality of display units having identification data corresponding to the index signal added to the transmitted image signal for each frame to display an image based on the transmitted image signal for each frame;

causing the plurality of display units to display a window under control of an application software;

holding display position information of the window; and controlling input and output of data using the window;

wherein, when the index signal added to the image signal for each frame is changed to an updated index signal, the window controller transforms the display position information of the window in accordance with the updated index signal.

10. The image signal generating method according to claim 9, wherein the display position information is represented by a coordinate in a coordinate system placed on a plane including display regions of the plurality of display units arranged in accordance with the identification data.

11. The image signal generating method according to claim 10, wherein an origin of the coordinate system is located at a specific position in the display region of the display unit having the identification data corresponding to the index signal added to the image signal for each frame.

12. The image signal generating method according to claim 11, wherein, when the index signal added to the image signal for each frame is changed to an updated index signal, the window controller changes the coordinate of the window to a new coordinate in a transformed coordinate system, an origin of which is located at a specific position of the display region of the display unit having identification data corresponding to the updated index signal.

13. The image signal generating method according to claim 9, wherein, when the index signal added to the image signal for each frame is changed to an updated index signal, the window controller reduces to zero a size of the window placed at a position other than the display region of the display unit having identification data corresponding to the updated index signal.

14. The image signal generating method according to claim 9, wherein, when a pointer is moved beyond a boundary between adjacent display regions of the plurality of display units, the index signal added to the image signal for each frame is changed to the updated index signal.

15. The image signal generating method according to claim 14, wherein, when the index signal added to the image signal for each frame is changed to the updated index signal, the window controller changes the coordinate of the pointer to a new coordinate in a transformed coordinate system, an origin of which is located at a specific position of the display region of the display unit having identification data corresponding to the updated index signal.

16. The image signal generating method according to claim 9, wherein the addition of the index signal is carried out by replacing a part of the image signal for each frame with the index signal.

17. A computer-readable information storage medium which contains a program for causing a computer system to perform an image signal processing, wherein the computer system transmits an image signal to a plurality of display units each having identification data, and the computer system includes an image signal generator which sequentially generates an image signal for each frame that is an image signal for displaying one page image in one frame period, the one page image being an image to be displayed on each of the plurality of display units;

the image signal processing comprising:

sequentially generating an image signal for each frame that is an image signal for displaying one page image in one frame period, the one page image being an image to be displayed on each of the plurality of display units;

adding an index signal to the image signal for each frame;

sequentially transmitting the image signal for each frame to the plurality of display units, thereby causing any of the plurality of display units having identification data corresponding to the index signal added to the transmitted image signal for each frame to display an image based on the transmitted image signal for each frame;

causing the plurality of display units to display a window under control of an application software;

holding display position information of the window; and controlling input and output of data using the window;

wherein, when the index signal added to the image signal for each frame is changed to an updated index signal, the window controller transforms the display position information of the window in accordance with the updated index signal.

18. A program for causing a computer system to perform an image signal processing, wherein the computer system transmits an image signal to a plurality of display units each having identification data, and the computer system includes an image signal generator which sequentially generates an image signal for each frame that is an image signal for displaying one page image in one frame period, the one page image being an image to be displayed on each of the plurality of display units;

the image signal processing comprising:

sequentially generating an image signal for each frame that is an image signal for displaying one page image in one frame period, the one page image being an image to be displayed on each of the plurality of display units;

adding an index signal to the image signal for each frame;

sequentially transmitting the image signal for each frame to the plurality of display units, thereby causing any of the plurality of display units having identification data corresponding to the index signal added to the transmitted image signal for each frame to display an image based on the transmitted image signal for each frame;

causing the plurality of display units to display a window under control of an application software;

holding display position information of the window; and controlling input and output of data using the window;

wherein, when the index signal added to the image signal for each frame is changed to an updated index signal, the window controller transforms the display position information of the window in accordance with the updated index signal.

* * * * *